(12) United States Patent
Kawamura et al.

(10) Patent No.: US 11,312,865 B2
(45) Date of Patent: Apr. 26, 2022

(54) IMAGE FORMING METHOD

(71) Applicant: Konica Minolta, Inc., Tokyo (JP)

(72) Inventors: Takaki Kawamura, Tokyo (JP); Noboru Ueda, Tokyo (JP); Natsuki Ito, Tokyo (JP); Yusuke Takigaura, Tokyo (JP); Ami Motohashi, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 120 days.

(21) Appl. No.: 17/011,694

(22) Filed: Sep. 3, 2020

(65) Prior Publication Data

US 2021/0095134 A1 Apr. 1, 2021

(30) Foreign Application Priority Data

Sep. 27, 2019 (JP) .............................. JP2019-177077

(51) Int. Cl.
*C09D 4/00* (2006.01)
*G03G 8/00* (2006.01)
*G03G 9/087* (2006.01)
*G03G 15/20* (2006.01)

(52) U.S. Cl.
CPC ................. *C09D 4/00* (2013.01); *G03G 8/00* (2013.01); *G03G 9/08775* (2013.01); *G03G 15/20* (2013.01)

(58) Field of Classification Search
CPC ........................... G03G 8/00; G03G 19/08775
See application file for complete search history.

(56) References Cited

U.S. PATENT DOCUMENTS

2012/0082829 A1 4/2012 Iio et al.

FOREIGN PATENT DOCUMENTS

| EP | 2042564 A1 * | 4/2009 | ............... C09D 4/06 |
|---|---|---|---|
| JP | 2012078485 A | 4/2012 | |
| JP | 2014215542 A | 11/2014 | |

* cited by examiner

*Primary Examiner* — Victor Verbitsky
(74) *Attorney, Agent, or Firm* — Lucas & Mercanti, LLP

(57) ABSTRACT

An object of the present invention is to provide an image forming method capable of coating a photocurable varnish without unevenness on a toner image formed using an electrostatic latent image developing toner, and further having good adhesion between a varnish layer and the toner image. The image forming method of the present invention comprises: forming a toner image on a recording medium using an electrostatic latent image developing toner containing a toner particle comprising a binder resin and a release agent; and forming a varnish layer on the toner image by applying and curing a photocurable varnish comprising a photocurable compound. The binder resin comprised in the electrostatic latent image developing toner contains a crystalline polyester resin. The photocurable compound comprised in the photocurable varnish comprises a diol di(meth) acrylate having a straight hydrocarbon chain.

9 Claims, 1 Drawing Sheet

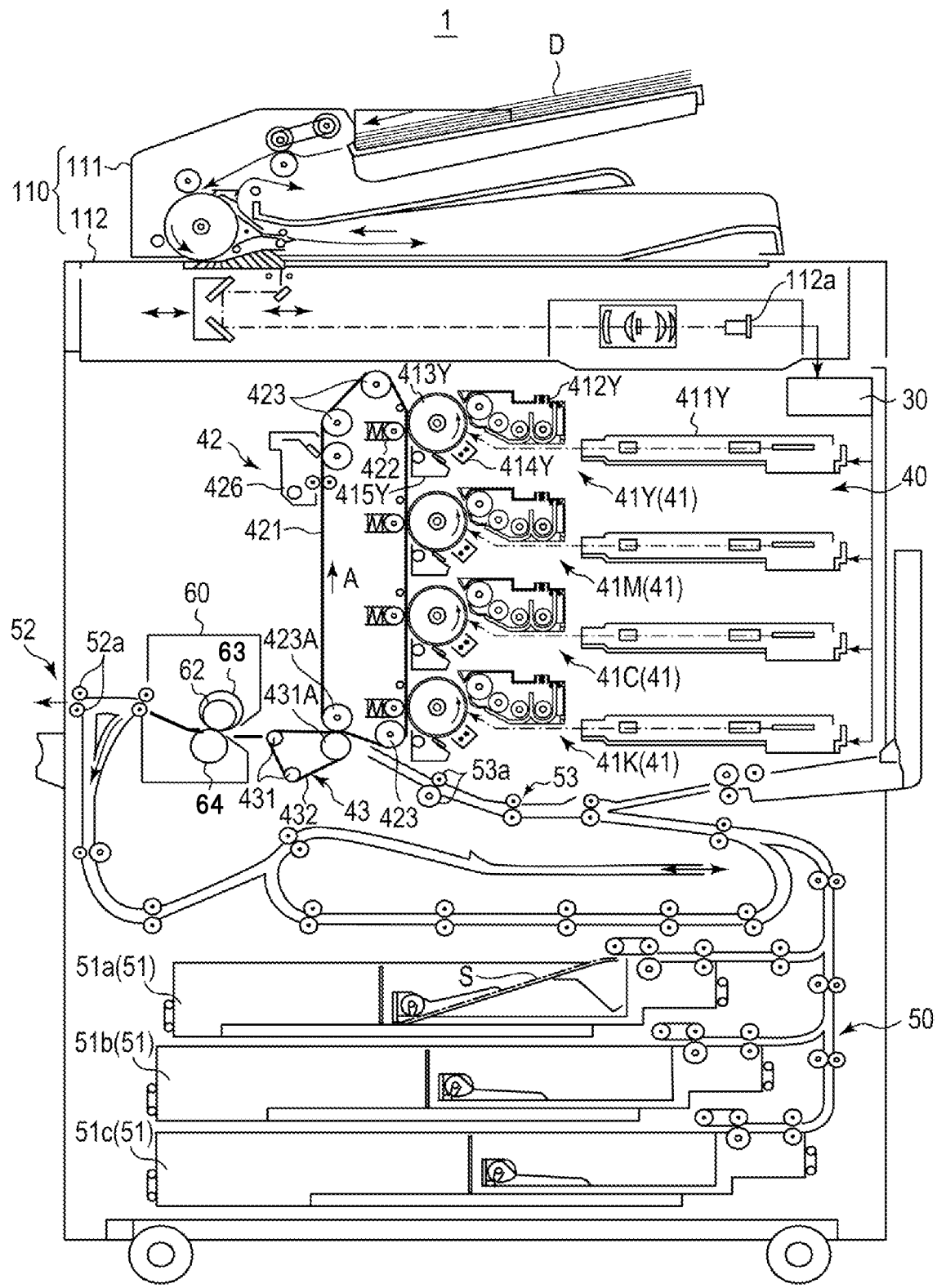

IMAGE FORMING METHOD

CROSS REFERENCE TO RELATED APPLICATIONS

The entire disclosure of Japanese Patent Application No. 2019-177077 filed on Sep. 27, 2019, including description, claims, drawings, and abstract the entire disclosure is incorporated herein by reference in its entirety.

BACKGROUND

Technological Field

The present invention relates to an image forming method.

Description of Related Art

Conventionally, varnishes have been applied on various images to improve quality, durability, and gloss. In recent years, there is a demand for applying varnishes on a toner image formed by electrophotography. However, the toner image formed by electrophotography tends to repel varnishes. Further, an adhesion between the toner image and a varnish layer obtained from the varnish is not sufficient. Therefore, there is a problem that the varnish layer is peeled off from the image.

In general, a release agent such as a hydrocarbon wax is present on a surface of the toner image formed by electrophotography. The hydrocarbon wax has a low affinity for common varnishes with a polar group. Accordingly, the toner image tends to repel the varnish, the varnish is less likely to wet evenly on the toner image.

In contrast, Japanese Patent Application Laid-Open No. 2012-78485 (hereinafter, "Patent Document 1") proposes an addition of a wax having a polar group and the hydrocarbon wax to a toner particle in order to improve the adhesion between the varnish layer and the toner image. Further, Japanese Patent Application Laid-Open No. 2014-215542 (hereinafter, "Patent Document 2") proposes an addition of a release agent having a (meth)acryloyl group in a toner particle in order to improve the applicability of the varnish.

In each of the Patent Documents 1 and 2, by introducing the polar group into the toner particle, the wettability of the varnish and the adhesion between the varnish layer and the toner image are improved. However, in the Patent Documents 1 and 2, the toner image may have areas of good wettability of the varnish and areas of poor wettability of the varnish. Therefore, further improvement in adhesion between the toner image and the varnish layer is required.

SUMMARY

The present invention has been completed in view of the above circumstances. An object of the present invention is to provide an image forming method capable of applying a photocurable varnish without unevenness on a toner image formed by using an electrostatic latent image developing toner, and further having a good adhesion between a varnish layer and the toner image.

To achieve at least one of the abovementioned objects, according to an aspect of the present invention, an image forming method reflecting one aspect of the present invention comprises: forming a toner image on a recording medium using an electrostatic latent image developing toner containing a toner particle comprising a binder resin and a release agent; and forming a varnish layer on the toner image by applying and curing a photocurable varnish comprising a photocurable compound, wherein the binder resin comprised in the electrostatic latent image developing toner contains a crystalline polyester resin, and the photocurable compound comprised in the photocurable varnish comprises a diol di(meth)acrylate having a straight hydrocarbon chain.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIGURE is a schematic view showing an example of an image forming apparatus used for forming a toner image in the image forming method of the present invention.

DETAILED DESCRIPTION OF EMBODIMENTS

Hereinafter, one or more embodiments of the present invention will be described with reference to the drawings. However, the scope of the invention is not limited to the disclosed embodiments.

An image forming method according to the present application includes forming a toner image on a recording medium using an electrostatic latent image developing toner (hereinafter also referred to as "toner image formation") and forming a varnish layer on the toner image by applying and curing a photocurable varnish comprising a photocurable compound (hereinafter also referred to as "varnish layer formation").

As described above, conventionally, when a photocurable varnish is applied on the toner image formed by the electrostatic latent image developing toner to form the varnish layer (a cured product of the photocurable varnish), there is a problem that the toner image tends to repel the photocurable varnish, an adhesion between the toner image and the varnish layer is insufficient, and the like. The photocurable varnish usually contains a highly polar compound, such as an acrylic monomer. Therefore, for example, it has been considered to use a wax having a polar group in the toner particle to improve the wettability of the photocurable varnish or to improve adhesion between the toner image and the varnish layer. However, in this method, the toner image tends to have areas of good wettability of the varnish and areas of poor wettability of the varnish, so that the adhesion between the toner image and the varnish layer may be insufficient. The reason is considered as follows.

When the wax having the polar group and the hydrocarbon wax are used in combination in the toner particle, the wax having the polar group has a very high affinity for a compound contained in the photocurable varnish. On the other hand, the hydrocarbon wax has a low affinity for the compound contained in the photocurable varnish. Further, it is difficult to strictly control an elution quantity of these waxes on the image surface. Therefore, the photocurable varnish is likely to locally adhere to a portion containing a large amount of wax having the polar group, and the photocurable varnish is unlikely to spread. On the other hand, the photocurable varnish easily wets and spreads in a portion containing a large amount of the hydrocarbon wax, but the adhesion between the toner image and the varnish layer is likely to be insufficient.

In contrast, the image forming method of the present application, a toner particle comprising a crystalline polyester resin is combined with a photocurable varnish comprising a diol di(meth)acrylate having a straight hydrocarbon chain. In this specification, the term "(meth)acrylate" indicates both or one of "acrylate" and "methacrylate" and the term "(meth)acryl" indicates both or one of "acryl" and "methacryl."

In general, a main chain of the crystalline polyester resin has ester bonds, which are polar groups, and hydrocarbon structures alternately. In other words, in the main chain of the crystalline polyester resin, parts with high and low affinity for the photocurable varnish are arranged alternately. Therefore, when such the crystalline polyester resin is arranged in the surface of the toner image, the photocurable varnish (e.g., diol di(meth)acrylate) uniformly wet and spread by the hydrocarbon structures of the crystalline polyester resin. In addition, the ester structures of the crystalline polyester resin interact with the polar group of the photocurable varnish, and the adhesion between the toner image and the varnish layer (the cured product of the photocurable varnish) is improved. Therefore, according to the method of the present application, the photocurable varnish can be applied onto the toner image formed by using the electrostatic latent image developing toner without unevenness, and furthermore, the adhesion between the obtained varnish layer and the toner image can be improved.

In addition, as described below, when the crystalline polyester resin contains a straight hydrocarbon chain in its main chain, the affinity between the straight hydrocarbon chain of the crystalline polyester resin and the straight hydrocarbon chain of the diol di(meth)acrylate can be improved. As a result, adhesion between the varnish layer and the toner image is enhanced. Hereinafter, the image forming method of the present application will be described.

1. Toner Image Formation

In the toner image formation, the toner image is formed on a recording medium using the electrostatic latent image developing toner (hereinafter also referred to simply as "toner") containing a specified toner particle. A method of forming the toner image using the toner is not particularly limited. For example, accommodating the toner in a following image forming device and forming the image on the recording medium may be used.

The recording medium used for forming the image is not particularly limited, and may be any of a plain paper from thin paper to thick paper, a superficial paper, a coated printing paper such as an art paper or a coated paper, a commercially available Japanese paper or a postcard paper, a plastic film for OHP, a cloth, and the like. Hereinafter, an image forming apparatus used in image formation will be described with reference to FIGURE.

Image forming apparatus 1 illustrated in FIGURE includes image reading section 110, image processing section 30, image forming section 40, paper conveying section 50, and fixing device 60.

Image forming section 40 has image forming units 41Y, 41M, 41C, and 41K that form images with respective color toners of Y (yellow), M (magenta), C (cyan), and K (black). All these units have the same configuration except toner to be housed therein, and therefore signs representing colors may be hereinafter abbreviated at times. Image forming section 40 further has intermediate transfer unit 42 and secondary transfer unit 43. These units correspond to a transfer device.

Image forming unit 41 has exposure device 411, developing device 412, photoconductor drum 413, charging device 414, and drum cleaning device 415. Photoconductor drum 413 is, for example, a negative charge type organic photoconductor. The surface of photoconductor drum 413 has photoconductive properties. Photoconductive drum 413 corresponds to a photoconductor. Charging device 414 is, for example, a corona charger. Charging device 414 may be a contact charging device that charges photoconductor drum 413 by contacting a contact charging member such as a charging roller, a charging brush or a charging blade with photoconductor 413. Exposure device 411 includes, for example, a semiconductor laser as a light source, and a light deflection device (polygon motor) that emits laser light in accordance with an image to be formed toward photoconductor drum 413.

Developing device 412 in FIGURE is a developing device in a two-component developing system. Developing device 412 includes, for example, a developing container that houses a two-component developer, a developing roller (magnetic roller) disposed rotatably at the opening of the developing container, a partition that parts the inside of the developing container such that the two-component developer can be in fluid communication, a conveyance roller for conveying the two-component developer on the opening side in the developing container toward the developing roller, and a stirring roller for stirring the two-component developer inside the developing container. The developing container contains the two-component developer, which will be described later.

Intermediate transfer unit 42 has intermediate transfer belt 421, primary transfer roller 422 that presses intermediate transfer belt 421 into close contact with photoconductor drum 413, a plurality of support rollers 423 including backup roller 423A, and belt cleaning device 426. Intermediate transfer belt 421 is stretched in a loop manner by the plurality of support rollers 423. The rotation of at least one driving roller of the plurality of support rollers 423 allows intermediate transfer belt 421 to run at a constant speed in the direction of arrow A.

Secondary transfer unit 43 has endless secondary transfer belt 432, and a plurality of support rollers 431 including secondary transfer roller 431A. Secondary transfer belt 432 is stretched in a loop manner by secondary transfer roller 431A and support rollers 431.

Fixing device 60 has, for example, fixing roller 62, endless heat-generating belt 63 for covering the outer peripheral surface of fixing roller 62 and for heating and melting a toner composing a toner image on sheet S, and pressure roller 64 that presses sheet S against fixing roller 62 and heat-generating belt 63. Sheet S corresponds to the recording medium.

Image forming apparatus 1 further has image reading section 110, image processing section 30 and sheet conveying section 50. Image reading section 110 has sheet feeder 111 and scanner 112. Sheet conveying section 50 has sheet feeding section 51, sheet discharging section 52, and conveying path section 53. Sheet S (standard sheet, special sheet) identified based on basis weight or size is housed for each preset type in three sheet feeding tray units 51a to 51c which constitute sheet feeding section 51. Conveying path section 53 has a plurality of pairs of conveying rollers such a pair of resist rollers 53a.

The formation of an image by image forming apparatus 1 will be described. Scanner 112 optically scans and reads manuscript D on contact glass. Light reflected from manuscript D is read by CCD sensor 112a to be input as image data. The input image data is subjected to a predetermined image processing in image processing section 30, and sent to exposure device 411.

Photoconductor drum 413 rotates at a constant peripheral speed. Charging device 414 charges the surface of photoconductor drum 413 uniformly to a negative polarity. In exposure device 411, a polygon mirror of a polygon motor rotates at high speed, and laser light corresponding to the input image data of each color component travels along the axial direction of photoconductor drum 413 to be ejected onto the outer peripheral surface of photoconductor drum 413 along the axial direction. Thus, an electrostatic latent image is formed on the surface of photoconductor drum 413.

In developing device 412, the conveyance and stirring of the two-component developer inside the developing container allow toner to be charged, and the two-component developer is conveyed to the developing roller to form a magnetic brush on the surface of the developing roller. The charged toner electrostatically adhere to an electrostatic latent image portion on photoconductor drum 413 from the magnetic brush. Thus, the electrostatic latent image on the surface of photoconductor drum 413 is visualized, and a toner image in accordance with the electrostatic latent image is formed on the surface of photoconductive drum 413.

The toner image on the surface of photoconductive drum 413 is transferred to intermediate transfer belt 421 by intermediate transfer unit 42. Untransferred toner remaining on the surface of photoconductive drum 413 after the transfer are removed by drum cleaning device 415 having a drum cleaning blade which slidably contacts the surface of photoconductive drum 413.

Primary transfer roller 422 presses intermediate transfer belt 421 into close contact with photoconductor drum 413, to thereby allows photoconductor drum 413 and intermediate transfer belt 421 to form a primary transfer nip for each photoconductor drum. At the primary transfer nip, toner images of the respective colors are transferred sequentially in a superimposed manner on intermediate transfer belt 421.

On the other hand, secondary transfer roller 431A is pressed into close contact with backup roller 423A with intermediate transfer belt 421 and secondary transfer belt 432 interposed therebetween. Thus, a secondary transfer nip is formed by intermediate transfer belt 421 and secondary transfer belt 432. Sheet S passes through the secondary transfer nip. Sheet S is conveyed to the secondary transfer nip by sheet conveying section 50. A resist roller section provided with pairs of resist rollers 53*a* corrects the inclination of sheet S and adjusts the timing of the conveyance.

When sheet S is conveyed to the secondary transfer nip, transfer bias is applied to secondary transfer roller 431A. The application of this transfer bias allows a toner image carried by intermediate transfer belt 421 to be transferred to sheet S. Sheet S on which the toner image is transferred is conveyed toward fixing device 60 by secondary transfer belt 432.

Fixing device 60 uses heat-generating belt 63 and pressure roller 64 to form a fixing nip and to heat and pressurize conveyed sheet S at the fixing nip portion. The toner which constituting the toner image on sheet S are heated. As a result, the crystalline polyester resin contained in the toner quickly melts inside the toner. Then, the entire toner quickly melts with a relatively small amount of heat, and the toner component adheres to sheet S. After that, a release agent contained in the toner and its peripheral component crystallizes rapidly, and the entire components solidify rapidly. That is, the toner image is quickly fixed to sheet S with a relatively small amount of heat. Sheet S on which the toner image is fixed is discharged out of the apparatus by sheet discharging section 52 provided with sheet discharging rollers 52*a*. Thus, a high-quality toner image is formed.

It is noted that untransferred toner remaining on the surface of intermediate transfer belt 421 after the secondary transfer are removed by belt cleaning device 426 having a belt cleaning blade which slidably contacts the surface of intermediate transfer belt 421.

Hereinafter, the toner used in the toner image formation will be described in detail. Although the toner image formation in which the toner is the two-component developer has been described above as an example, the toner may be a one-component developer. The one-component developer mainly consists of the toner particle.

On the other hand, the two-component developer is composed of the toner particle and a carrier particle. When the electrostatic latent image developing toner is the two-component developer, a content ratio (weight ratio) of the toner particle and the carrier particle is not particularly limited. However, from the viewpoint of a charging property and a storage property of the electrostatic latent image developing toner, the content ratio of toner particle to the carrier particle is preferably from 1:100 to 30:100, and more preferably from 3:100 to 20:100.

[Toner Particle]

In this specification, the toner particle may be a toner base particle containing at least a binder resin and a release agent, or a combination of the toner base particle and an external additive. Hereinafter, when it is not necessary to particularly distinguish these, they are simply referred to as "toner particle". As described above, the toner particle includes at least a binder resin and a release agent.

(Binder Resin)

The binder resin is a resin which binds the toner particle to the recording medium. The binder resin contains at least the crystalline polyester resin, but usually further contains an amorphous resin together with the crystalline polyester resin.

Crystalline Polyester Resin

The crystalline polyester resin may be any resin having a plurality of ester structures and having crystallinity. In this specification, "crystalline" means that the material has a distinct endothermic peak in differential scanning calorimetry measurement (DSC) rather than a stepwise endothermic change. In addition, "a distinct endothermic peak" means a peak in which the full width at half maximum of the endothermic peak is less than 15° C. when measurement is performed at a temperature rise rate of 10° C./min in DSC. It can be said that the smaller the full width at half maximum of the endothermic peak, the higher the crystallinity. The binder resin may contain only one crystalline polyester resin or two or more crystalline polyester resins.

When the photocurable varnish is applied on the toner image, if the binder resin contains the crystalline polyester resin, the photocurable varnish is less likely to be repelled, and further, adhesion between the varnish layer obtained from the photocurable varnish and the toner image is increased. Further, if the binder resin contains the crystalline polyester resin, a melt viscosity of the binder resin becomes sufficiently low at a time of fixing the toner particle, and the toner particle can be fixed at a low temperature (hereinafter, also referred to as "low-temperature fixing property") by said fixing device 60 of said image forming device 1. When the melt viscosity of the toner particle is low, the release agent is sufficiently eluted from the toner particle and crystallized. As a result, the toner particle is less likely to adhere to said pressure roller 64 or the like (hereinafter, also referred to as "fixing and separating property"). Furthermore, the image with excellent scratch resistance is easily obtained. From the viewpoint that these effects are easily obtained, the content of the crystalline polyester resin is preferably 5 parts by mass or more and 20 parts by mass or less, more preferably 8 parts by mass or more and 15 parts by mass or less relative to 100 parts by mass of the total amount of the binder resin.

In addition, a melting point of the crystalline polyester resin is preferably 50° C. or more and 85° C. or less from the viewpoint of sufficiently softening the toner particle to ensure sufficient low-temperature fixing property, and more preferably 60° C. or more and 80° C. or less from the viewpoint of further improving various characteristics in good balance. The melting point of the crystalline polyester resin can be controlled by the structure of the resin (e.g., the type of monomer).

Further, a weight average molecular weight (Mw) of the crystalline polyester resin is preferably 5,000 to 50,000, and a number average molecular weight (Mn) is preferably 2,000 to 10,000. When the weight average molecular weight (Mw) and the number average molecular weight (Mn) of the crystalline polyester resin are within these range, the low-temperature fixing property is improved.

The above-mentioned crystalline polyester resin can be obtained, for example, by using a known synthesis method through dehydration condensation reaction between a polycarboxylic acid and a polyalcohol.

The polycarboxylic acid for obtaining the crystalline polyester resin may be any carboxylic acid having two or more carboxy group. For example, polycarboxylic acids having three or more carboxy groups such as trimellitic acid or pyromellitic acid may be used. However, from the viewpoint of crystallinity of the crystalline polyester resin, dicarboxylic acids are preferred. Examples of the dicarboxylic acids include aliphatic dicarboxylic acids such as oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid, 1,11-undecanedicarboxylic acid, 1,12-dodecanedicarboxylic acid, 1,13-tridecanedicarboxylic acid, 1,14-tetradecanedicarboxylic acid, 1,16-hexadecanedicarboxylic acid, and 1,18-octadecanedicarboxylic acid; aromatic dicarboxylic acids such as terephthalic acid, isophthalic acid, orthophthalic acid, t-butylisophthalic acid, 2,6-naphthalenedicarboxylic acid and 4,4'-biphenyldicarboxylic acid. The crystalline polyester resin may include structural units derived from one dicarboxylic acid or two or more dicarboxylic acids.

Among them, the aliphatic dicarboxylic acids are preferred from the viewpoint of improving crystallinity of the crystalline polyester resin and affinity with diol di(meth) acrylate in the photocurable varnish. In addition, a number of carbon atoms of a straight hydrocarbon chain possessed by the aliphatic dicarboxylic acid is preferably 6 to 16, more preferably 10 to 14. It is noted that the hydrocarbon chain of the aliphatic dicarboxylic acid may be partially branched. In this case, a hydrocarbon chain sandwiched between two carboxylic groups is identified as the straight hydrocarbon chain.

The polyalcohol for obtaining the crystalline polyester resin may be any alcohol having two or more hydroxyl group. For example, polyalcohols having three or more hydroxyl groups such as glycerin, pentaerythritol, trimethylolpropane, and sorbitol. However, from the viewpoint of crystallinity of the crystalline polyester resin, diols are preferred. Examples of diols include aliphatic diols such as ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol and 1,20-eicosanediol; diols having a double bond such as 2-buten-1,4-diol, 3-hexen-1,6-diol and 4-octen-1,8-diol; diols having a sulfonic acid group.

Among them, aliphatic diols are preferred from the viewpoint of improving the low-temperature fixing property, transferability of the toner particle, and the affinity with diol di (meth) acrylate in the photocurable varnish. In addition, a number of carbon atoms of a straight hydrocarbon chain possessed by the aliphatic diol is preferably 2 to 12, and particularly preferably 4 to 6. It is noted that the hydrocarbon chain of the aliphatic diol may be partially branched. In this case, a hydrocarbon chain sandwiched between two hydroxyl groups is identified as the straight hydrocarbon chain.

As described above, it is preferable that the crystalline polyester resin has the straight hydrocarbon chain derived from the aliphatic dicarboxylic acid or derived from the aliphatic diol in its main chain. Further, an absolute value of a difference between the number of carbon atoms in the straight hydrocarbon chain of the crystalline polyester resin and a number of carbon atoms in the straight hydrocarbon chain of the diol di(meth)acrylate contained in the photocurable varnish is preferably 8 or less, more preferably 6 or less. When these numbers of carbon atoms are close to each other, the hydrocarbon structure of the diol di(meth)acrylate and the hydrocarbon structure of the crystalline polyester are likely to interact each other, and the adhesion between the toner image and the varnish layer is improved.

When the crystalline polyester resin contains a plurality of straight hydrocarbon chains having different number of carbon atoms (e.g., when the number of carbon atoms of the straight hydrocarbon chain derived from the aliphatic dicarboxylic acid and the number of carbon atoms of the straight hydrocarbon chain derived from the aliphatic diol are different from each other), it is preferable that the absolute value of the difference between the number of carbon atoms in any straight hydrocarbon chain of the crystalline polyester resin and the number of carbon atoms in the straight hydrocarbon chain of the diol di(meth)acrylate is 8 or less. However, when the absolute value of the difference between the number of carbon atoms in each straight hydrocarbon chain possessed by the main chain of the crystalline polyester resin and the number of carbon atoms in the straight hydrocarbon chain of the diol di(meth)acrylate is 8 or less, the adhesion between the toner image and the varnish layer is further enhanced.

The crystalline polyester resin may be a hybrid crystalline polyester resin having a segment derived from the above crystalline polyester resin (hereinafter, also referred to as "crystalline polyester resin segment") and a segment derived from an amorphous resin (hereinafter, also referred to as "amorphous resin segment"). When the crystalline polyester resin is the hybrid crystalline polyester resin, the affinity between the crystalline polyester resin in the binder resin and the amorphous resin in the binder resin is increased, and the low-temperature fixing property of the toner particle is improved. Further, the crystalline polyester resin can be uniformly dispersed in the binder resin and thus the toner particle, so that the wettability of the photocurable varnish and the adhesion between the toner image and the varnish layer are improved.

In this specification, "crystalline polyester resin segment" means a portion derived from the crystalline polyester resin described above, and has a chemical structure as that of the crystalline polyester resin described above. In addition, "amorphous resin segment" means a portion derived from an amorphous resin described later, and has a chemical structure as that of the amorphous resin.

Examples of the amorphous resin segments include vinyl-based resin segments, urethane resin segments, and urea resin segments. Among them, from the viewpoint of easy control of thermoplasticity, the vinyl based resin segments are preferred, and styrene-(meth)acrylic resin segment is particularly preferred.

The amorphous resin segment is chemically bonded so as not to impair crystallinity of the crystalline polyester resin segment. For example, the amorphous resin segment may be bonded between the crystalline polyester resin segments. In other words, the crystalline polyester resin segment and the amorphous resin segment may be alternately bonded. Further, the amorphous resin segment may be graft-bonded to a main chain of the crystalline polyester resin segment. On the other hand, the crystalline polyester resin segment may be graft-bonded to the amorphous resin segment. The crystalline polyester resin segment and the amorphous resin segment can be bonded by, for example, an ester bond, a covalent bond by an addition reaction of an unsaturated group, or the like, but the bonding method is not limited thereto.

A content of the crystalline polyester resin segment in the hybrid crystalline polyester resin is preferably 80 to 98 mass %, preferably 90 to 95 mass %, and more preferably 91 to 93 mass %, from the viewpoint of imparting enough crystallinity to hybrid resin and maintaining original characteristics of the crystalline polyester resin described above. The composition of the respective resin segments in the hybrid crystalline polyester resin (or in the toner particle) and the content thereof are determined by known analytical methods such as nuclear magnetic resonance (NMR) and pyrolitic methylation gas chromatography/mass spectrometry (Py-GC/MS).

Amorphous Resin

The amorphous resin contained in the binder resin is a resin having substantially no crystallinity Examples of the amorphous resins include amorphous polyester resins, vinyl resins, urethane resins, urea resins, and a partially modified amorphous modified polyester resins. The binder resin may contain only one kind of amorphous resin or two or more kinds of amorphous resins.

It is preferable that the amorphous resin contains a large amount of the vinyl-based resin among them. The vinyl-based resin is hardly compatibilized with the release agent. Therefore, when the binder resin contains a large amount of the vinyl based resin, the release agent is finely dispersed in the toner particle. As a result, the release agent is easily eluted from of the toner particle when the toner is fixed.

The amount of the vinyl-based resin is preferably 50 parts by mass or more, more preferably 75 parts by mass or more, relative to 100 parts by mass of the total amount of the amorphous resin. When the amount of the vinyl-based resin is within the range, a dispersibility of the release agent is improved.

The vinyl-based resin is a resin obtained by polymerization of monomers having a vinyl group or a derivative thereof. The binder resin may contain only one kind of vinyl-based resin or two or more kinds of vinyl-based resin. Examples of the vinyl-based resins include, but are not limited to, styrene-(meth) acrylic resins.

Examples of the styrene-(meth)acrylic resins include resins obtained by polymerizing styrene and/or derivatives thereof, (meth) acrylic esters, and amphoteric compounds having a carboxylic group or a hydroxy group and an unsaturated duplex bond by a known method.

Examples of styrene and derivatives thereof include styrene, o-methylstyrene, m-methylstyrene, p-methylstyrene, α-methylstyrene, p-phenylstyrene, p-ethylstyrene, 2,4-dimethylstyrene, p-tert-butylstyrene, p-n-hexylstyrene, p-n-octylstyrene, p-n-nonylstyrene, p-n-decylstyrene, and p-n-dodecylstyrene and the like.

Examples of (meth) acrylic esters include acrylic acid ester monomers such as methyl acrylate, ethyl acrylate, isopropyl acrylate, n-butyl acrylate, t-butyl acrylate, isobutyl acrylate, n-octyl acrylate, 2-ethylhexyl acrylate, stearyl acrylate, lauryl acrylate and phenyl acrylate; and methacrylic acid esters such as methyl methacrylate, ethyl methacrylate, n-butyl methacrylate, isopropyl methacrylate, isobutyl methacrylate, t-butyl methacrylate, n-octyl methacrylate, 2-ethylhexyl methacrylate, stearyl methacrylate, lauryl methacrylate, phenyl methacrylate, diethylaminoethyl methacrylate and dimethylaminoethyl methacrylate. In this specification, the (meth) acrylic ester monomer having a hydroxy group is treated as the amphoteric compound described below.

The amphoteric compound may be any compound having a carboxylic group or hydroxy group and an unsaturated double bond. Examples of the amphoteric compounds include compounds having a carboxy group such as acrylic acid, methacrylic acid, maleic acid, itaconic acid, cinnamic acid, fumaric acid, maleic acid monoalkyl esters and itaconic acid monoalkyl esters; and compounds having a hydroxy group such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth) acrylate, 4-hydroxybutyl (meth)acrylate and polyethylene glycol mono(meth)acrylate.

An amount of the structural unit derived from styrene and/or derivatives thereof in the styrene (meth)acrylic resin is preferably 40 to 90 mass %, an amount of the structural unit derived from the (meth)acrylic ester is preferably 10 to 60 mass %, and an amount of the structural unit derived from the amphoteric compound is preferably 0.5 to 20 mass %.

From the viewpoint of easy control of plasticity of the styrene (meth)acrylic resin, a weight average molecular weight (Mw) of the styrene (meth)acrylic resin is preferably 5,000 to 150,000, more preferably 10,000 to 70,000.

On the other hand, it is preferable that the binder resin further contains the amorphous polyester resin. The amorphous polyester resin is a polyester resin, which has no melting point and has a relatively high glass transition temperature (Tg) when subjected to differential scanning calorimetry measurement (DSC). The structure (structural unit) of the amorphous polyester resin is different from the structure (structural unit) of the crystalline polyester resin described above. Therefore, it is possible to determine the presence of the amorphous polyester resin by analysis such as NMR.

The amorphous polyester resin is obtained, for example, by a polycondensation reaction of a following polycarboxylic acid and a following polyalcohol.

Examples of the polyvalent carboxylic acids for obtaining the amorphous polyester resins include unsaturated aliphatic polycarboxylic acids, aromatic polycarboxylic acids, and derivatives thereof. However, as long as it is possible to obtain the amorphous polyester resin, the aliphatic polycarboxylic acids described in the description relating to the crystalline polyester resin described above may be partially used.

Examples of the unsaturated aliphatic polycarboxylic acids include unsaturated aliphatic dicarboxylic acids such as methylene succinic acid, fumaric acid, maleic acid, 3-hexenedioic acid, 3-octenedioic acid, and succinic acid substituted with an alkenyl group having 2 to 20 carbon atoms; unsaturated aliphatic tricarboxylic acids such as 3-buten-1,2,3-tricarboxylic acid, 4-penten-1,2,4-tricarboxylic acid, and aconitic acid; unsaturated aliphatic tetracarboxylic acids such as 4-penten-1,2,3,4-tetracarboxylic acid. Further, these lower alkyl esters or acid anhydrides may be used.

Examples of the aromatic polycarboxylic acids include aromatic dicarboxylic acid such as phthalic acid, terephthalic acid, isophthalic acid, t-butylisophthalic acid, chlorophthalic acid, nitrophthalic acid, p-phenylenediacetic acid, 2,6-naphthalenedicarboxylic acid, 4,4'-biphenyldicarboxylic acid, and anthracenedicarboxylic acid; aromatic tricarboxylic acids such as 1,2,4-benzenetricarboxylic acid (i.e. trimellitic acid), 1,2,5-benzenetricarboxylic acid (i.e. trimesic acid), 1,2,4-naphthalenetricathoxylic acid, hemimellitic acid; aromatic tetracarboxylic acids such as pyromellitic acid and 1,2,3,4-butanetetracarboxylic acid; aromatic hexacarboxylic acids such as mellitic acid. Further, these lower alkyl esters or acid anhydrides may be used.

On the other hand, examples of polyalcohols for obtaining the amorphous polyester resin include unsaturated aliphatic polyalcohols, aromatic polyalcohols, and derivatives thereof. As long as it is possible to obtain the amorphous polyester resin, the aliphatic diols described in the description relating to the crystalline polyester resin described above may be partially used.

Examples of the unsaturated aliphatic polyalcohols include unsaturated aliphatic diols such as 2-buten-1,4-diol, 3-buten-1,4-diol, 2-butyn-1,4-diol, 3-butyn-1,4-diol, and 9-octadecen-7,12-diol, and derivatives thereof.

Examples of the aromatic polyalcohols include, bisphenols such as bisphenol A and bisphenol F; ethylene oxide adducts of bisphenols; alkylene oxide adducts of bisphenols such as propylene oxide adducts; 1,3,5-benzenetriol; 1,2,4-benzenetriol; and 1,3,5-trihydroxymethylbenzene. Further, these derivatives may be used. Among them, bisphenol A compounds such as ethylene oxide adducts of bisphenol A or propylene oxide adducts of bisphenol A are preferred from the viewpoint of easy control of thermal properties of the toner particle.

A weight average molecular weight (Mw) of the amorphous polyester resin is not particularly limited, but is preferably 5,000 to 100,000, more preferably 5,000 to 50,000. When the weight average molecular weight (Mw) is 5,000 or more, the heat-resistant storage property of the toner particle is improved. On the other hand, when it is 100,000 or less, the low-temperature fixing property of the toner particle is enhanced.

Further, the amorphous polyester resin may be a hybrid amorphous polyester resin having a segment derived from an amorphous polyester resin (hereinafter, also referred to as an "amorphous polyester resin segment") and an amorphous resin segment derived from other than the amorphous polyester resin (hereinafter, also referred to as an "amorphous resin segment"). When the amorphous polyester resin is the hybrid amorphous polyester resin, the plasticity of the toner particle is easily controlled.

In this specification, "amorphous polyester resin segment" means a portion derived from the amorphous polyester resin described above, and has a chemical structure as that of the amorphous polyester resin described above. The "amorphous resin segment" means a portion derived from an amorphous resin other than the amorphous polyester resin.

Examples of the amorphous resin segments include vinyl-based resin segments, urethane resin segments, and urea resin segments. Among them, from the viewpoint of easy control of plasticity, the vinyl-based resin segments are preferred, and a styrene-(meth)acrylic resin segment is particularly preferred.

The amorphous resin segment is chemically bonded to the amorphous polyester resin segment so as not to impair the characteristics of the amorphous polyester resin segment. For example, the amorphous resin segment may be bonded between the amorphous polyester resin segments. In other words, the amorphous polyester resin segment and the amorphous resin segment may be alternately bonded. Further, the amorphous resin segment may be graft-bonded to a main chain of the amorphous polyester resin segment. On the other hand, the amorphous polyester resin segment may be graft-bonded to the amorphous resin segment. The amorphous polyester resin segment and the amorphous resin segment can be bonded by, for example, an ester bond, a covalent bond by an addition reaction of an unsaturated group, or the like, but the bonding method is not limited thereto.

A content of the amorphous polyester resin segment in hybrid amorphous polyester resin is preferably 80 to 98 mass %, more preferably 90 to 95 mass %, and still more preferably 91 to 93 mass %, from the viewpoint of maintaining original characteristics of the amorphous polyester resin described above. The composition of the respective resin segments in hybrid amorphous polyester resin (or in the toner particle) and the content thereof can be determined by known analytical methods such as nuclear magnetic resonance (NMR) and pyrolitic methylation gas chromatography/mass spectrometry (Py-GC/MS).

(Release Agent)

The release agent is a component which elute from the toner particle during the development and enhances the fixing and separating property and the like of the toner particle. Generally, a wax is used for the release agent. Although there is no particular limitation on the type of the wax, it is particularly preferred to include both an ester wax and a hydrocarbon wax.

When the toner particle contain two release agents, the release agent having a higher melting point first crystallizes into crystal nuclei after elution of these release agents from the toner particle, and promotes crystallization of the release agent having a lower melting point. Therefore, crystallization of the release agents after elution is enhanced. As a result, the release agents are sufficiently crystallized after the toner image is fixed and before it is discharged from the said image forming device 1. That is, in the sheet discharging process or the like, an adhesion of the toner particle to the members of said image forming apparatus 1 is suppressed, and a contamination of the next image is suppressed.

Ester waxes have high affinity for the crystalline polyester resins and typically have low melting point. Therefore, it is easier to elute from the toner particle at the time of fixing. Therefore, when the release agent contains the ester wax, fixability and scratch resistance of the toner image are increased.

Ester wax may be any wax such as mono-ester waxes, diester waxes, triester waxes, tetra-ester waxes, and waxes having five or more ester bonds.

Examples of the ester waxes include monoesterified products obtained by a reaction of a higher fatty acid with a higher alcohol; diester products obtained by a reaction of a higher fatty acid with a diol or a reaction of a higher alcohol with a dicarboxylic acid; triesterified products obtained by a reaction of trimethylolpropane with a higher fatty acid; triesterified products obtained by a reaction of glycerin with a higher fatty acid; tetraesterified products obtained by a reaction of pentaerythritol with a higher fatty acid; esterified products obtained by a reaction of a hydroxy acid such as citric acid with a higher fatty acid or a higher alcohol; esterified products obtained by a reaction of a carboxylic acid such as a cyclic carboxylic acid having aromatic ring or an alcohol with a higher fatty acid or a higher alcohol.

A hydrocarbon chain contained in the higher fatty acid and the higher alcohol preferably has 13 to 30 carbon atoms, more preferably 17 to 22 carbon atoms. The diol and the dicarboxylic acid are preferably compounds having two hydroxyl groups or two carboxy groups at both ends of a hydrocarbon chain including 1 to 30 carbon atoms.

Each hydrocarbon group may be substituted with an alkyl group having a straight or branched chain, an alkenyl group, an alkynyl group, an aromatic ring group, an aromatic heterocyclic group, a non-aromatic ring group, an alkoxy group, a cycloalkoxy group, an aryloxy group, an alkylthio group, an cycloalkylthio group, an arylthio group, an alkoxycarbonyl group, an aryloxycarbonyl group, a sulfamoyl group, an acyl group, an acyloxy group, an amide group, a carbamoyl group, an ureid group, a sulfinyl group, an alkylsulfonyl group, an arylsulfonyl group, a heteroarylsulfonyl group, an amino group, a halogen atom, a fluorohydrocarbon group, cyano group, a nitro group, a hydroxy group, a thiol group, a silyl group, a deuterium atom, or the like.

Specific examples of ester waxes include behenyl behenate, triglycerol behenic acid ester, pentaerythritol tetrastearate, stearyl stearate, pentaerythritol tetrabehenate, ethyleneglycol stearate, ethyleneglycol behenate, neopentylglycol stearate, neopentylglycol behenate, 1,6-hexanediol stearate, 1,6-hexanediol behenate, glycerine stearate, glycerine behenate, stearyl citrate, behenyl citrate, stearyl cyclic carboxylic acid, benenyl cyclic carboxylic acid and the like. The above ester wax may be a natural wax such as carnauba wax.

It is preferable that a melting point (Tm (A)) of the ester wax satisfies following Formula (1).

$$65° \text{ C.} \leq Tm(A) \leq 80° \text{ C.} \qquad \text{Formula (1)}$$

When the melting point (Tm (A)) of the ester wax is 65° C. or higher, the amount of the release agent (ester wax) eluted during the fixing the toner particle is not too much, and the eluted release agent (ester wax) can be sufficiently crystallized before the discharging of the toner image. As result, the release agent is hardly adhered to the member in said image forming device 1. When the melting point (Tm (A)) of the above ester wax is 80° C. or less, the release agent (ester wax) can sufficiently elute from the toner particle during fixing, so that the fixing and separating property of the toner particle and the scratch resistance of the toner image are enhanced. Further, when the melting point (Tm (A)) of the ester wax is 80° C. or less, the toner particle can be more sufficiently melted at the time of fixing, so that the low-temperature fixing property is increased.

From the above viewpoint, it is more preferable that the melting point (Tm (A)) of the ester wax satisfies following Formula (1-1).

$$70° \text{ C.} \leq Tm(A) \leq 80° \text{ C.} \qquad \text{Formula (1-1)}$$

On the other hand, since the hydrocarbon wax typically has a melting point higher than that of the ester wax, it tends to crystallize prior to the ester wax after elution from the toner particle, and itself becomes a crystal nucleus to promote crystallization of the ester wax. Therefore, the hydrocarbon wax is hardly adhered to the member in image forming device 1.

Examples of hydrocarbon waxes include low molecular weight polyethylene waxes, low molecular weight polypropylene waxes, Fischer-Tropsch waxes, microcrystalline waxes, paraffin waxes, and the like.

In addition, it is preferable that a melting point (Tm (B)) of the hydrocarbon wax satisfies following Formula (2).

$$80° \text{ C.} \leq Tm(B) \leq 95° \text{ C.} \qquad \text{Formula (2)}$$

When the melting point (Tm (B)) of the hydrocarbon wax is 80° C. or higher, the hydrocarbon wax tends to crystallize after elution from the toner particle, and crystallization of the ester wax is also promoted. On the other hand, when the melting point (Tm (B)) of the hydrocarbon wax is 95° C. or less, the hydrocarbon wax sufficiently elutes from the toner particle at the time of fixing, so that the fixing and separating property of the toner particle and the scratch resistance of the toner image are enhanced. Further, when the melting point (Tm (B)) of the hydrocarbon wax is 95° C. or less, the toner particle can be more sufficiently melted at the time of fixing, so that the low-temperature fixing property can be further increased.

From the above viewpoint, it is more preferable that the melting point (Tm (B)) of the hydrocarbon wax satisfies following Formula (2-1).

$$85° \text{ C.} \leq Tm(B) \leq 90° \text{ C.} \qquad \text{Formula (2-1)}$$

Further, the ester wax and the hydrocarbon wax are preferably combined so that each melting point Tm (A) and Tm (B) satisfies the following Formula (3).

$$5° \text{ C.} \leq (Tm(B) - Tm(A)) \qquad \text{Formula (3)}$$

When the difference between Tm (B) and Tm (A) is 5° C. or higher, the hydrocarbon wax crystallizes more quickly than the ester wax at the time of fixing, and promotes crystallization of the ester wax as the crystal nucleus. Therefore, the crystallization rate of the entire release agent is increased, and the release agent adhesion in image forming device 1 is hardly caused.

In particular, the ester wax and the hydrocarbon wax are preferably combined so that each melting point Tm (A) and Tm (B) satisfies following Formula (3-1).

$$8° \text{ C.} \leq (Tm(B) - Tm(A)) \qquad \text{Formula (3-1)}$$

The upper limit of the difference between Tm (B) and Tm (A) is not particularly limited, but may be 25° C.

Also, the content ratio of the ester wax and the hydrocarbon wax is preferably 5/95 to 95/5, more preferably 10/90 to 90/10, and still more preferably 15/85 to 85/15. When the amount of the hydrocarbon wax is 5 parts by mass or more relative to 100 parts by mass of the total of the ester wax and the hydrocarbon wax, the amount of the wax having a relatively high melting point becomes sufficiently large. Therefore, the crystallization of the release agent eluted during fixing tends to be accelerated. On the other hand, when the amount of the ester wax having a relatively low melting point is 5 parts by mass or more relative to 100 parts by mass of the total of the ester wax and the hydrocarbon wax, the release agent tends to elute from the toner particle during fixing. Therefore, the low-temperature fixing property, the fixing separating property, and the scratch resistance of the toner image are further enhanced.

A total amount of the release agent is preferably 3 parts by mass or more and 20 parts by mass or less, and more preferably 5 parts by mass or more and 15 parts by mass or less, relative to 100 parts by mass of the total amount of the binder resin.

The toner particle may further contain a release agent other than the above, such as an amide wax.

(Other Components)

The toner particle may optionally contain a colorant, a charge control agent, and the like.

Examples of the colorant include carbon black, magnetic materials, pigments, dyes, and the like. The toner particle may contain one colorant or two or more colorants.

Examples of the carbon black include channel black, furnace black, acetylene black, thermal black and lamp black.

Examples of the above magnetic material include ferromagnetic metals such as iron, nickel, and cobalt, alloys containing these metals, and compounds of ferromagnetic metals such as ferrite and magnetite.

Examples of the pigments include C.I. Pigment Reds 2, 3, 5, 7, 15, 16, 48:1, 48:3, 53:1, 57:1, 81:4, 122, 123, 139, 144, 149, 166, 177, 178, 208, 209, 222, 238, 269; C.I. Pigment Oranges 31, 43; C.I. Pigment Yellows 3, 9, 14, 17, 35, 36, 65, 74, 83, 93, 94, 98, 110, 111, 138, 139, 153, 155, 180, 181, 185; C.I. Pigment Green 7; C.I. Pigment Blues 15:3, 15:4, 60; and phthalocyanine pigments in which a center metal is zinc, titanium, magnesium, or the like.

Examples of the dyes include C.I. Solvent Reds 1, 3, 14, 17, 18, 22, 23, 49, 51, 52, 58, 63, 87, 111, 122, 127, 128, 131, 145, 146, 149, 150, 151, 152, 153, 154, 155, 156, 157, 158, 176, 179; pyrazolotriazole azomethine dyes; pyrazolotriazole azomethine dyes; pyrazolone azo dyes; C.I. Solvent Yellows 19, 44, 77, 79, 81, 82, 93, 98, 98, 103, 104,112, 162; C.I. Solvent Blues 25, 36, 60, 70, 93 and 95.

The amount of the colorant is preferably 1 to 30 parts by mass, more preferably 2 to 20 parts by mass relative to 100 parts by mass of the total amount of the toner particle.

Examples of the charge control agent include nigrosine-based dyes, metal salts of a naphthenic acids or higher fatty acids, alkoxylated amines, quaternary ammonium salts, azo-based metal complexes, and salicylic acid metal salts or a metal complexes thereof.

The amount of the charge control agent is preferably 0.1 to 5.0 parts by mass relative to 100 parts by mass of the total amount of the binder resin.

(External Additives)

The external additive controls fluidity and charging property of the toner particle. The toner particle may contain only one external additive or two or more external additives.

Examples of the external additive include particle of silicon oxide, titan oxide, aluminum oxide, zirconium oxide, zinc oxide, chromium oxide, cerium oxide, antimony oxide, tungsten oxide, tin oxide, tellurium oxide, manganese oxide, boron oxide, and the like.

A surface of the external additive is preferably hydrophobized. For the hydrophobization, a known surface treatment agent may be used. The surface treatment may be used alone or in combination of two or more. Examples of the surface treatment agent include silane coupling agents, silicone oils, titanate-based coupling agents, aluminate-based coupling agents, fatty acids, fatty acid metal salts, esterified compounds thereof, rosin acids, and the like.

Examples of the silane coupling agents include dimethyldimethoxysilane, hexamethyldisilazane (i.e. HMDS), methyltrimethoxysilane, isobutyltrimethoxysilane, decyltrimethoxysilane, and the like. Examples of the silicone oils include cyclic compounds, linear or branched organosiloxanes, and the like, more specifically, organosiloxane oligomers, octamethylcyclotetrasiloxane, decamethylcyclopentasiloxane, tetramethylcyclotetrasiloxane, tetravinyl tetramethylcyclotetrasiloxane, and the like.

Examples of the silicone oils include highly reactive modified silicone oils having at least one modified terminal in the structure, such as a side chain, one terminal, both terminals, one side chain terminal, both side chain terminal, or the like. The silicone oil may include one modifying group or two or more modifying groups. Examples of the modifying groups include alkoxy groups, carboxyl group, carbinol group, higher fatty acid modifying groups, phenol, epoxy group, (meth)acryloyl group, and amino group.

A content of the external additive is preferably 0.1 mass % or more and 10.0 mass % or less, more preferably 1.0 mass % or more and 3.0 mass % or less, based on the total amount of the toner particle.

(Particle Size of the Toner Particle)

A size and shape of the toner particle are not particularly limited as long as they do not impair the effect and object of the present imaging forming method. Usually, a volume number average particle diameter of the toner particle is preferably 3.0 μm or more and 8.0 μm or less, and an average circularity of the toner particle is preferably 0.920 or more and 1.000 or less.

The volume number average particle diameter of the toner particle can be measured and analyzed by an apparatus in which a computer system for data processing is connected to Multi-Sizer 3 (manufactured by Beckman Coulter). In addition, the number the average particle diameter of the toner particle can be adjusted by, for example, a temperature and a stirring condition during a production of the toner particle, a classification of the toner particle, a mixing of a classified toner particle, and the like.

The average circularity of the toner particle is analyzed by a flow-type particle image analyzer "FPIA-3000" (manufactured by Sysmex). A circularity C of a predetermined number of toner particles is calculated by following Formula (c) from a perimeter L1 of a circle having the same projected area as a projected particle image and a perimeter L2 of the projected particle image. Next, a sum of C is calculated, and a value obtained by dividing the total sum by the number of particles is taken as the circularity of the toner particle.

$$C = L1/L2 \qquad \text{Formula (c)}$$

(Toner Particle Producing Method)

A method for producing the toner particle is not particularly limited and can be produced by a known method. For example, an emulsion polymerization aggregation method in which each component described above is aggregated and polymerized or an emulsion aggregation method can be applied.

An example of a method for producing the toner particle will be described. First, an aqueous dispersion is prepared by dispersing an amorphous resin particle containing the release agent and the binder resin other than the crystalline polyester resin in an aqueous medium. More specifically, a particulate amorphous resin containing no release agent is dispersed and aggregated in an aqueous medium until it becomes a predetermined size of particle (first stage). Thereafter, a particulate release agent and a particulate amorphous resin are added to the dispersion and further aggregated (second stage). As a result, the amorphous resin particle containing a large amount of the release agent on the surface side is obtained. Thereafter, if necessary, a particulate binder resin (amorphous resin) is added to the dispersion, and further aggregated around the periphery (third stage).

Another aqueous dispersion is prepared by dispersing the crystalline polyester resin in an aqueous medium. Further different aqueous dispersion is prepared by dispersing the colorant is dispersed in an aqueous medium. Then, above mentioned aqueous dispersion of the amorphous resin, the aqueous dispersion of the crystalline polyester resin, and the aqueous dispersion of the colorant are mixed to aggregate these particles.

In this specification, "aqueous dispersion" means a dispersion in which a dispersoid (particle) are dispersed in an aqueous medium whose main component (50 mass % or more) is water. The aqueous medium is water and/or water-soluble organic solvent, such as methanol, ethanol, isopropanol, butanol, acetone, methyl ethyl ketone, and tetrahydrofuran.

Although the aggregate obtained as described above may be used as the toner base particle as it is, a shell layer can be further formed on the surface of the aggregate, and the toner base particle can have a core-shell structure. The shell layer may not cover the entire surface of the core particle, and may partially expose the core particle. The cross-section of the core-shell structure can be observed by known device such as a transmission electron microscope (TEM), a scanning probe microscope (SPM), etc.

According to such the core-shell structure, a characteristics of the toner based particle, such as a glass transition temperature, a melting point, hardness, and the like, can be made different between the core particle and the shell layer. Therefore, the toner base particle can be provided with characteristic according to a purpose. For example, the toner base particle comprises the core particle containing a component (the binder resin, the colorant, the release agent, or the like) having a low glass transition temperature (Tg) and the shell layer containing a resin having a relatively high glass transition temperature (Tg). In this case, the shell layer preferably contains the amorphous resin, particularly the amorphous polyester resin.

The method of forming the shell layer around the aggregate is not particularly limited, and may be a method of adding an aqueous dispersion containing an amorphous polyester resin particle or the like to the aqueous dispersion containing the above aggregate, and aggregating the amorphous polyester resin particle around the aggregate.

After forming of the toner base particle, the toner base particle and the external additive are mixed to obtain the toner particle which contains the toner base particle and the external additive.

On the other hand, the method of producing the toner base particle may contain: a preparation step of preparing an aqueous dispersion containing the amorphous resin and the aqueous medium; a preparation step of preparing an aqueous dispersion containing the crystalline polyester resin and the aqueous medium; a preparation step of preparing an aqueous dispersion containing the colorant and the aqueous medium; and a mixing step of mixing those aqueous dispersions and aggregating those particles. Also in this case, a shell layer can be formed around the aggregate.

[Carrier Particle]

The carrier particle contained in the two component developer may be a magnetic particle known in the art. Examples of the carrier particle include metals, such as iron, ferrite, and magnetite, or alloys of these metals with aluminum or lead. The carrier particle can be a coated carrier particle including a core material particle consisting of the magnetic material and a coating layer covering the surface of the core material particle. The carrier particle can be a resin-dispersed carrier particle including a fine particle of a magnetic material dispersed in a resin. The carrier particle is preferably the coated carrier particle from the viewpoint of preventing the carrier particle from attaching to a photoconductor.

A volume base median particle diameter of the carrier particle is preferably 15 μm or more and 100 μm or less, more preferably 25 μm or more and 80 μm or less. The volume base median particle diameter of the carrier particle can be measured with a laser-diffractive particle size distribution measurement device (HELOS, manufactured by SYMPATEC Co.) with a wet variance machine.

The carrier particle is mixed with the toner particle in an appropriate amount. Examples of mixing apparatuses for the mixing include a Nauta mixer, and W-cone and V-shaped mixers.

2. Varnish Layer Formation

In a varnish layer formation, the photocurable varnish containing a photocurable compound is applied onto the toner image formed in the above-described toner image formation and cured to form a varnish layer. The photocurable varnish may be applied so as to cover the entire toner image, and may be applied so as to cover only a portion of the toner image The method of applying the photocurable varnish on the toner image is not particularly limited as long as the photocurable varnish can be uniformly applied. Examples of the application apparatus include a liquid film coating apparatus including a varnish coater, a roll coater, a flexo coater, a rod coater, a blade, a wire bar, an air knife, a curtain coater, a slide coater, a doctor blade, a screen coater, a gravure coater (e.g., an offset gravure coater), a slot coater, an extrusion coater, and the like. Examples also include an apparatus utilizing well-known manners such as forward and reverse roll coating, offset gravure coating, curtain coating, lithographic coating, screen coating, and gravure coating.

The photocurable varnish to be applied on the image is not limited as long as it contains the photocurable compound, but usually includes a polymerization initiator (sensitizer) together with the photocurable compound.

The photocurable compound may be a monomer, an oligomer, or a polymer. However, the photocurable compound includes the diol di(meth)acrylate having at least a straight hydrocarbon structure. When the photocurable varnish contains the diol di(meth)acrylate, affinity between the photocurable varnish and the crystalline polyester resin in the toner particle is increased. In addition, wettability of the photocurable varnish to the toner image is improved, and further, adhesion between the obtained varnish layer and the toner image is enhanced.

The diol di(meth)acrylate having a straight hydrocarbon structure is a monomer obtained by dehydrating and condensation an aliphatic diol and two (meth)acrylic acid. The hydrocarbon structure of the diol di(meth)acrylate may be partially branched. In this case, a hydrocarbon chain sandwiched between two ester bonds is identified as the straight hydrocarbon structure.

The number of carbon atoms of the straight hydrocarbon structure of diol di(meth)acrylate is preferably 4 to 12, more preferably 6 to 10, and still more preferably 6 to 9. When the number of carbon atoms of the straight hydrocarbon structure of the diol di(meth)acrylate is within this range, a viscosity of the photocurable varnish becomes an appropriate range, and a coatability tends to be enhanced. Further, the affinity between the photocurable varnish and the crystalline polyester resin in the toner particle tends to be improved.

Specific examples of the diol di (meth) acrylate include hexanediol diacrylate, nonanediol diacrylate, decanediol diacrylate, and the like. Among these, hexanediol diacrylate is particularly preferred.

An amount of the diol di(meth) acrylate having the straight hydrocarbon structure is preferably 10 to 80 parts by mass, more preferably 20 to 65 parts by mass relative to 100 parts by mass of the total amount of the photocurable compound. When the amount of the diol di(meth)acrylate is within this range, adhesion between image and the varnish layer is enhanced.

Examples of the photocurable compounds other than diol di(meth)acrylate include acrylic resins; vinyl acrylic resins; acrylic acid esters of polyalcohol; epoxy acrylates; urethane acrylates; polyester acrylates; polyether acrylates; acrylic modified alkyd resins; polymerizable oligomers or a polymerizable polymers of melamine acrylates; (meth)acrylate monomers such as trimethylolpropane (meth)acrylate, phenoxyethyl (meth)acrylate, and the like; tri(meth)acrylate monomers; and the like. An amount and a type of the photocurable compound other than the diol di(meth)acrylate are appropriately selected according to a curability, viscosity, surface tension, and the like of the photocurable varnish.

Examples of the polymerization initiators (sensitizer) include a known anthraquinone-based initiators, benzophenone-based initiators, 2-ethylanthraquinone-based initiators, acylphosphine oxide based initiators, alkylphenone-based photopolymerization initiators, and the like. An amount of the polymerization initiator is preferably 5 to 25 parts by mass relative to the total amount of the photocurable varnish. When the amount of the polymerization initiator is within this range, curability of the photocurable varnish is enhanced.

In addition, the photocurable varnish may include surfactants, examples of which include anionic surfactants, nonionic surfactants, silicone surfactants, fluorosurfactants, and the like. Examples of the anionic surfactants include sulfosuccinates, disulfonates, phosphate esters, sulfates, sulfonates, and the like. Examples of nonionic surfactants may include polyvinyl alcohols, polyacrylic acids, isopropyl alcohol, acetylene-based diols, ethoxylated octylphenol, ethoxylated branched secondary alcohols, perfluorobutane sulfonates, and alkoxylated alcohols, and the like. Examples of the silicone surfactants include polyether-modified polydimethylsiloxanes and the like. Examples of the fluorosurfactants include ethoxylated nonylphenols and the like. When the photocurable varnish contains the surfactant, adhesion between the toner image and the varnish layer is enhanced. Further, it is also possible to adjust the surface tension of the photocurable varnish and to enhance the wettability of the photocurable varnish.

A surface tension at 25° C. of the above photocurable varnish is preferably 10 to 50 mN/m, more preferably 15 to 45 mN/m, and even more preferably 20 to 40 mN/m. When the surface tension of the photocurable varnish is within this range, the photocurable varnish is easily wetted and spread on the toner image. The surface tension of the photocurable varnish is measured by a plating method with KYOWA DY300 (manufactured by Kyowa Interface Chemical Co., Ltd.).

A viscosity at 25° C. of the photocurable varnish measured with a vibrating viscometer 30 seconds after immersion of a vibrator to the photocurable varnish is preferably 100 to 800 mPa·s, more preferably 150 to 700 mPa·s, and even more preferably 200 to 600 mPa·s. When the viscosity of the photocurable varnish is within the above range, the coating can be easily performed by the above-described method.

After the application of the photocurable varnish, light energy is irradiated to cure the photocurable varnish. The type of light energy to be irradiated is appropriately selected depending on the type of the polymerization initiator and the like, but is usually ultraviolet light, visible light, or the like. Examples of light sources of the light energy include a low-pressure mercury lamp, a medium-pressure mercury lamp, a high-pressure mercury lamp, an ultra-high-pressure mercury lamp, a xenon lamp, a carbon arc lamp, a metal halide lamp, a fluorescent lamp, a tungsten lamp, a LED, and the like. A light amount and irradiation time thereof are appropriately selected.

EXAMPLES

Hereinafter, specific examples of the present invention will be described together with comparative examples, but the present invention is not limited thereto.

1. Preparation of Colorant Dispersion 90 parts by mass of sodium dodecyl sulfate was added to 1600 parts by mass of ion-exchanged water. While stirring the solution, 420 parts by mass of copper phthalocyanine (Blue 15:3) was gradually added. The colorant (copper phthalocyanine (Blue 15:3)) was dispersed by an agitator Creamix (Creamix is a registered trademark, manufactured by Em Technique Co., Ltd.) to prepare a colorant dispersion with a solid content of 20 mass %. The average particle diameter of the colorant (volume base median particle diameter) measured with the Micro Trak UPA-150 (manufactured by Nikkiso Co., Ltd.) was 110 nm.

2. Preparation of Amorphous Resin Particle Dispersion A

[Preparation of Amorphous Resin Particle Dispersion (Amorphous Dispersion) A1]

(1) First Stage Polymerization 8 parts by mass of sodium dodecyl sulfate and 3000 parts by mass of ion-exchanged water were added to a reaction vessel of a 5 L attached with a stirring device, a temperature sensor, a cooling tube, and a nitrogen introducing device. After that, the internal temperature of the reaction vessel was raised to 80° C. while stirring at a stirring speed of 230 rpm under a nitrogen stream. After raising the temperature, an aqueous solution obtained by dissolving 10 parts by mass of potassium persulfate (KPS) in 200 parts by mass of ion-exchanged water was added to the reaction vessel, and the internal temperature of the reaction vessel was again set at 80° C. A monomer mixture 1 having the following composition was added dropwise to the reaction vessel over 1 hour. Then, the mixture was heated at 80° C. for 2 hours and stirred to polymerize. As a result, a resin particle dispersion a1 was obtained.

(Monomer Mixture 1)

Styrene (St) 480 parts by mass
n-butyl acrylate (BA) 250 parts by mass
Methacrylic acid (MAA) 68 parts by mass (2) Second Stage Polymerization A solution in which 7 parts by mass of sodium polyoxyethylene (2) dodecylether sulfate was dissolved in 3000 parts by mass of ion-exchanged water were added to a reaction vessel of a 5 L attached with a stirring device, a temperature sensor, a cooling tube, and a nitrogen introducing device. Next, the internal temperature of the reaction vessel was raised to 80° C. After raising the temperature, 289 parts by mass of the resin particle dispersion a1 and a monomer mixture 2 having the following composition were added to the reaction vessel. The monomer mixture was prepared by dissolving following monomers and a release agent at 90° C. By dispersing the mixture with the agitator Creamix (manufactured by Em Technique Co., Ltd.) for 10 minutes, a dispersion containing emulsified particles (oil droplets) was obtained. It is noted that following behenyl behenate is a release agent, and its melting point is 73° C.

(Monomer Mixture 2)
Styrene (St) 245 parts by mass
2-ethylhexylacrylate (2EHA) 96.6 parts by mass
Methacrylic acid (MAA) 37 parts by mass
n-octyl-3-mercaptopropionate (NOM) 5.24 parts by mass
Behenyl behenate (melting point: 73° C.) 172.8 parts by mass Then, a polymerization initiator solution in which 5.2 parts by mass of potassium persulfate (KPS) was dissolved in 200 parts by mass of ion-exchanged water was added to the dispersion. After that, the mixture was heated at 84° C. for 1 hour and stirred to polymerize. As a result, a resin particle dispersion a2 was obtained.

(3) Third Stage Polymerization 400 parts by mass of ion-exchanged water was added to the resin particle dispersion a2. After mixing well, a solution in which 7.04 parts by mass of potassium persulfate (KPS) was dissolved in 400 parts by mass of ion-exchanged water was added to the dispersion. Then, the internal temperature of the reaction vessel was raised to 82° C. A monomer mixture 3 having the following composition was added dropwise to the mixture over 1 hour. After completion of the dropwise addition, the mixture was heated and stirred for 2 hours to polymerize, and then cooled to 28° C. to obtain an amorphous resin particle dispersion (hereinafter also referred to as "amorphous dispersion") A1 comprising a vinyl resin (i.e. styrene-acrylic resin).

| (Monomer Mixture 3) | |
|---|---|
| Styrene (St) | 348 parts by mass |
| n-butyl acrylate (BA) | 169.1 parts by mass |
| Methacrylic acid (MAA) | 49.6 parts by mass |
| n-octyl-3-mercaptopropionate (NOM) | 9.3 parts by mass |

The physical properties of the amorphous dispersion A1 were measured. The volume base median particle diameter (d50) of the amorphous resin particle was 220 nm, the glass transition temperature (Tg) was 46° C., and the weight average molecular weight (Mw) was 32,000.

[Preparation of Amorphous Resin Particle Dispersions (Amorphous Dispersions) A2 to A8]

Each amorphous dispersions A2 to A8 containing amorphous resin particle a2 to a8 were prepared in the same manner as in the preparation of the amorphous dispersion A1 described above, except that the type of release agent (melting point of following microcrystalline: 89° C.) or the composition of monomers in the second stage polymerization, or the composition of monomers in the third stage polymerization were changed as shown in Table 1.

TABLE 1

| Amorphous Resin Particle | First Stage Polymerization Monomer | | | | Second Stage Polymerization | | | |
|---|---|---|---|---|---|---|---|---|
| | | | | | First Stage Polymerization | Monomer | | |
| | St | BA | MAA | KPS | | St | 2EHA | MAA |
| a1 | 480 | 250 | 68 | 10 | 289 | 245 | 96.6 | 37 |
| a2 | ↑ | ↑ | ↑ | ↑ | ↑ | ↑ | ↑ | ↑ |
| a3 | ↑ | ↑ | ↑ | ↑ | ↑ | ↑ | ↑ | ↑ |
| a4 | ↑ | ↑ | ↑ | ↑ | ↑ | ↑ | ↑ | ↑ |
| a5 | ↑ | ↑ | ↑ | ↑ | ↑ | ↑ | ↑ | ↑ |
| a6 | ↑ | ↑ | ↑ | ↑ | ↑ | ↑ | ↑ | ↑ |
| a7 | ↑ | ↑ | ↑ | ↑ | ↑ | ↑ | ↑ | ↑ |
| a8 | ↑ | ↑ | ↑ | ↑ | ↑ | 267 | 105.2 | 40.2 |

| Amorphous Resin Particle | Second Stage Polymerization | | Release Agent | | Third Stage Polymerization Monomer | | | | |
|---|---|---|---|---|---|---|---|---|---|
| | Monomer | | Behenyl Behenate | Micro crystallin | | | | | |
| | NOM | KPS | (mp: 73) | (mp: 89) | St | BA | MAA | NOM | KPS |
| a1 | 5.24 | 5.2 | 172.8 | — | 348 | 169.1 | 49.6 | 9.3 | 7.04 |
| a2 | ↑ | ↑ | — | 172.8 | ↑ | ↑ | ↑ | ↑ | ↑ |
| a3 | ↑ | ↑ | 86.4 | 86.4 | ↑ | ↑ | ↑ | ↑ | ↑ |
| a4 | ↑ | ↑ | 164.2 | 8.6 | ↑ | ↑ | ↑ | ↑ | ↑ |
| a5 | ↑ | ↑ | 8.6 | 164.2 | ↑ | ↑ | ↑ | ↑ | ↑ |
| a6 | ↑ | ↑ | 121.0 | 51.8 | ↑ | ↑ | ↑ | ↑ | ↑ |
| a7 | ↑ | ↑ | 51.8 | 121.0 | ↑ | ↑ | ↑ | ↑ | ↑ |
| a8 | 5.64 | 5.7 | 43.2 | 43.2 | 379 | 184.2 | 54 | 10 | 7.67 |

3. Preparation of Crystalline Polyester Resin Particle Dispersion

[Synthesis of Crystalline Polyester Resin b1]

Following raw material monomers and a polymerization initiator for amorphous resin segments (styrene-acrylic resin (StAc)) were added to a drop funnel.

| | |
|---|---|
| Styrene | 21.7 parts by mass |
| n-butyl acrylate | 8 parts by mass |
| Acrylic acid | 1.8 parts by mass |
| Polymerization initiator (di-t-butyl peroxide) | 4 parts by mass |

On the other hand, following raw material monomers of a crystalline polyester resin segment (crystalline polyester resin: CPEs) were added to a 4 necked flask equipped with a nitrogen introducing pipe, a dehydrating pipe, a stirring device, and a thermocouple, and heated and dissolved at 170° C.

Tetradecanediacid 440 parts by mass

Butanediol 135 parts by mass

Then, while stirring the mixture, the raw material monomers of the amorphous resin segment (StAc) was added dropwise to the mixture from the drop funnel over 90 minutes, and aging was performed for 60 minutes. Thereafter, unreacted monomers were removed under reduced pressure (8 kPa). The amount of removed monomer was very small with respect to the amount of the raw material monomers. Then, 0.8 parts by mass of a $Ti(OBu)_4$ was mixed as an esterification catalyst, and the internal temperature of the flask was raised to 235° C. The reaction under normal pressure (101.3 kPa) was carried out for 5 hours, and the reaction under reduced pressure (8 kPa) was carried out for 1 hour.

The mixture was cooled to 200° C., and then reacted under reduced pressure (20 kPa) for 1 hour to obtain a crystalline polyester resin (hybrid crystalline polyester resin) b1. The crystalline polyester resin b1 contained 5 mass % of an amorphous polyester resin segment (StAc). The crystalline polyester resin b1 was a resin in a form in which a crystalline polyester resin segment (CPEs) was grafted to the amorphous resin segment (StAc). The number average molecular weight (Mn) of the obtained crystalline polyester resin b1 was 4,030, the weight average molecular weight (Mw) was 20,100, the melting point (Tm) was 77° C., and the melt viscosity was 11.5 mPa·s.

[Synthesis of Crystalline Polyester Resin b2]

Following raw monomers and a radical polymerization initiator for an amorphous resin segment (styrene-acrylic resin: StAc) were added to a drop funnel.

| | |
|---|---|
| Styrene | 86.8 parts by mass |
| n-butyl acrylate | 32 parts by mass |
| Acrylic acid | 7.2 parts by mass |
| Polymerization initiator (di-t-butyl peroxide) | 16 parts by mass |

On the other hand, following raw material monomers of a crystalline polyester resin segment (crystalline polyester resin: CPEs) were added to a 4 necked flask equipped with a nitrogen introducing pipe, a dehydrating pipe, a stirring device, and a thermocouple, and heated and dissolved at 170° C.

Tetradecanediacid 440 parts by mass

Butanediol 135 parts mass

Then, while stirring the mixture, the raw material monomers of the amorphous resin segment (StAc) was added dropwise to the mixture from the drop funnel over 90 minutes, and aging was performed for 60 minutes. Thereafter, unreacted monomers were removed under reduced pressure (8 kPa). The amount of monomers removed was very small with respect to the raw material monomers. Thereafter, 0.8 parts by mass of $Ti(OBu)_4$ was mixed as an esterification catalyst, the temperature was raised to 235° C. The reaction normal pressure (101.3 kPa) was carried out for 5 hours, and further reaction under reduced pressure (8 kPa) was carried out for 1 hour.

Next, the mixture was cooled to 200° C., and then reacted under reduced pressure (20 kPa) for 1 hour to obtain a crystalline polyester resin (hybrid crystalline polyester resin) b2. The crystalline polyester resin b2 contained 20 mass % of an amorphous resin segment (StAc) based on its total amount. The crystalline polyester resin b2 was a resin in a form in which the crystalline polyester resin segment (CPEs) was grafted to the amorphous resin segment (StAc). The number of average molecular weight (Mn) of obtained crystalline polyester resin b2 was 4,380, the weight average molecular weight (Mw) was 33,000, the melting point (Tm) was 72° C., and the melt viscosity was 15.0 mPa·s.

[Synthesis of Crystalline Polyester Resin b3]

A crystalline polyester resin b3 was obtained in the same manner as in the synthesis of the crystalline polyester resin b1, except that the raw material monomers of the amorphous resin segment (styrene acrylic resin: StAc) was not added dropwise. The number average molecular weight (Mn) of the crystalline polyester resin b3 was 3,140, the weight average molecular weight (Mw) was 13,300, the melting point (Tm) was 80° C., and the melt viscosity was 8 mPa·s.

[Preparation of Crystalline Polyester Resin Particle Dispersion B1]

82 parts by mass of the above crystalline polyester resin b1 was dissolved in 82 parts by mass of methyl ethyl ketone by stirring at 70° C. for 30 minutes. Next, 2.5 parts by mass of 25 mass % of an aqueous sodium hydroxide solution (corresponding to a neutralization degree of 50%) was added to the mixture. The mixture was poured in a reaction vessel having a stirring device. While stirring the mixture, 236 parts by mass of water warmed to 70° C. was added and mixed dropwise over 70 minutes. In the middle of the dropping, the liquid in the reaction vessel became white turbid, and an emulsified state was uniformly obtained after the entire amount of the water was dropped. When the particle size of the oil droplets in this emulsion was measured by a laser diffractive type particle size distributing measurement device LA-750 (manufactured by HORIBA), the volume base average particle diameter was 123 nm.

While the emulsion was kept warm at 70° C., the pressure in the reaction vessel was reduced to 15 kPa (150 mbar) by a diaphragm type vacuum pump V-700 (manufactured by BUCHI Ltd.). The emulsion was stirred for 3 hours, and distilled and removed methylethylketone. Thereafter, a crystalline polyester resin particle dispersion B1 in which the crystalline polyester resin b1 was dispersed (solid content 25 wt %) was obtained. The volume base average particle diameter of the crystalline polyester resin particle b1 in the dispersion B1 measured with the above mentioned apparatus was 200 nm.

[Preparation of Crystalline Polyester Resin Particle Dispersions B2 and B3]

Crystalline polyester resin particle dispersions B2 and B3 were prepared in the same manner as in the preparation of the crystalline polyester resin particle dispersion B1 except that crystalline polyester resin b2 or b3 was used instead of crystalline polyester resin b 1. Both of the volume base average particle diameters of the crystalline polyester resin particle b2 and b3 were 200 nm.

TABLE 2

| Crystalline Polyester Resin Particle Dispersion | Crystallinity Polyester Resin | Styrene Acrylic Modified Crystalline Polyester Resin Composition ratio | | Melting Point (° C.) | Melt Viscosity (mPa · s) | Mn | Mw |
|---|---|---|---|---|---|---|---|
| | | Crystallinity Polyester Resin Segment | Amorphous resin (StAc) Segment | | | | |
| Crystalline Polyester Resin Particle Dispersion B1 | Crystallinity Polyester Resin b1 | 95 | 5 | 77 | 11.5 | 4030 | 20100 |
| Crystalline Polyester Resin Particle Dispersion B2 | Crystallinity Polyester Resin b2 | 80 | 20 | 72 | 15 | 4380 | 33000 |
| Crystalline Polyester Resin Particle Dispersion B3 | Crystallinity Polyester Resin b3 | 100 | 0 | 80 | 8 | 3140 | 13300 |

4. Preparation of Amorphous Polyester Resin Particle Dispersion C

[Preparation of Amorphous Polyester Resin c]

Following raw material monomers and a polymerization initiator for an amorphous resin segment (styrene-acrylic resin: StAc) was added to a drop funnel.

| | |
|---|---|
| Styrene | 80.0 parts by mass |
| n-butyl acrylate e | 20.0 parts by mass |
| Acrylic acid | 10.0 parts by mass |
| Polymerization initiator (di-t-butyl peroxide) | 16.0 parts by mass |

On the other hand, following raw material monomers of an amorphous polyester resin segment (amorphous polyester resin) was added to a 4 necked flask equipped with a nitrogen introduction pipe, a dehydration pipe, a stirring device, and a thermocouple, and heated and dissolved at 170° C.

| | |
|---|---|
| ethylene oxide 2-mol adduct of Bisphenol A | 59.1 parts by mass |
| propylene oxide 2-mol adduct of Bisphenol A | 281.7 parts by mass |
| Terephthalic acid | 63.9 parts by mass |
| Succinic acid | 48.4 parts by mass |

Then, while stirring the mixture, the raw material monomers of an amorphous resin segment (StAc) was added dropwise to the mixture from a drop funnel over 90 minutes, and aging was performed for 60 minutes. Thereafter, unreacted monomers were removed under reduced pressure (8 kPa). Then, 0.4 parts by mass of $Ti(OBu)_4$ was mixed as an esterification catalyst, and the temperature was raised to 235° C. The reaction under normal pressure (101.3 kPa) was carried out for 5 hours, further reaction under reduced pressure (8 kPa) was carried out for 1 hour. Next, the mixture was cooled to 200° C., and the reaction was carried out under reduced pressure (20 kPa), followed by desolvation to obtain an amorphous polyester resin (hybrid amorphous polyester resin) c. The weight average molecular weight (Mw) of the obtained amorphous polyester resin c was 24,000, the acid value was 16.2 mgKOH/g, and the glass transition temperature (Tg) was 60° C.

[Preparation of Amorphous Polyester Resin Particle Dispersion C]

100 parts by mass of the amorphous polyester resin c was dissolved in 400 parts by mass of ethyl acetate (manufactured by Kanto Chemical Co., Ltd.) and mixed with 638 parts by mass of a sodium lauryl sulfate solution having 0.26 mass % concentration prepared in advance. While the mixture was stirred, ultrasonic dispersion was carried with an ultrasonic homogenizer US-150T (manufactured by Nippon Seiki Co., Ltd.) at a V-LEVEL of 400 μA for 30 minutes. Thereafter, the temperature of the mixture was raised to 40° C., the pressure was reduced by a diaphragm type vacuum pump V-700 (manufactured by BUCHI Ltd.). Then, while stirring under reduced pressure for 3 hours, ethyl acetate was completely removed. As a result, an amorphous polyester resin particle dispersion C having a solid content of 13.5 mass % was obtained. The volume base median particle diameter of the amorphous polyester resin particle in the amorphous polyester resin particle dispersion C was a 98 nm.

5. Preparation of Release Agent Dispersion

The following materials were mixed and heated to 80° C., and dispersed with Ultra-Tarrux T50 (manufactured by IKA).

| | |
|---|---|
| Behenyl behenate (release agent, melting point 73° C.) | 100 parts by mass |
| Anionic surfactant (neogen RK, manufactured by Daiichi Pharmaceutical Co., Ltd.) | 10 parts by mass |
| Ion-exchanged water | 400 parts by mass |

Thereafter, further dispersion was carried out with a pressure-discharge type gaulin homogenizer, and ion-exchanged water was added to the dispersion to adjust the solid content to 15 mass % to obtain a release agent dispersion. The volume base median particle diameter of the release agent particle in the dispersion measured with a laser diffractive type particle size distributor measurement LA-750 (manufactured by HORIBA) was 220 nm.

6. Preparation of Toner Particle

[Preparation of Toner Particle 1]

346 parts by mass (solid equivalent) of the amorphous resin particle dispersion A1 and 2,000 parts by mass of ion-exchanged water were added to a reaction vessel equipped with a stirring device, a temperature sensor, and a cooling tube. The pH of the mixture was adjusted to 10 by adding 5 mol/L aqueous sodium hydroxide solution at room temperature (25° C.). 7 parts by mass (solid equivalent) of the colorant dispersion was added to the mixture. Further, an aqueous solution in which 60 parts by mass of magnesium chloride was dissolved in 60 parts by mass of ion-exchanged water was mixed dropwise at 30° C. for 10 minutes. After leaving the mixture for 3 minutes, the mixture was warmed to 80° C. over 60 minutes. After reaching 80° C., 43.25 parts by mass (solid equivalent) of the crystalline polyester resin particle dispersion B1 was added over 20 minutes. Thereafter, stirring was performed so that the particle growth rate was 0.01 μm/min, and the volume base median particle diameter of 6.0 μm measured by Coulter Multisizer 3 (manufactured Coulter Beckman).

Next, 43.25 parts by mass (solid equivalent) of the amorphous polyester resin particle dispersion C was added to the mixture over 30 minutes. Then, when the supernatant of the reaction solution became transparent, an aqueous solution in which 190 parts by mass of sodium chloride was dissolved in 760 parts by mass of ion-exchanged water was added to stop the growth of particle. The temperature of the mixture was raised to 80° C., and the mixture was stirred. In this condition, fusing of the particles was carried out until the average circularity of the toner particle became 0.970. Thereafter, the mixture was cooled to 30° C. or less.

Next, the temperature of the mixture was increased to 50° C. over 30 minutes while stirring. The mixture was subjected to 3 hours heat treatment. Then, mixture was cooled to 30° C. or less. After that, solid-liquid separation was performed and the dehydrated toner cake was again dispersed in ion-exchanged water. The operation of solid-liquid separation, that is, washing, was repeated three times. After washing, the toner base particle was obtained by drying at 40° C. for 24 hours. 0.6 parts by mass of hydrophobic silica particle (number average primary particle diameter: 12 nm, degree of hydrophobization: 68), 1.0 parts by mass of hydrophobic titanium oxide particle (number average primary particle diameter: 20 nm, degree of hydrophobization: 63), and 1.0 parts by mass of sol-gel silica (number average primary particle diameter: 110 nm) were added to the toner base particle, and mixed by Henschel mixer (manufactured by Nippon Coke and engineering Industry Co., Ltd.) at a rotating blade peripheral speed of 35 mm/sec for 20 minutes at 32° C. After the mixing, coarse particle were removed by using a sieve having an opening of 45 μm to obtain toner particle 1.

[Preparation of Toner Particle 2-10, and 12]

Toner particles 2 to 10 and 12 were produced in the same manner as the toner particle 1 except that a type of the amorphous resin particle dispersion A and a type of the crystalline polyester resin particle dispersion B were changed as shown in the following tables.

[Preparation of Toner Particle 11]

297.56 parts by mass (solid equivalent) of the amorphous polyester resin particle dispersion C, 48.44 parts by mass (solid equivalent) of the release agent dispersion, and 2000 parts by mass of ion-exchanged water were added to a reaction vessel equipped with a stirring device, a temperature sensor, and a cooling tube. The pH of the mixture was adjusted to 10 by adding 5 mol/L aqueous sodium hydroxide solution at room temperature (25° C.). 7 parts by mass (solid equivalent) of the colorant dispersion was added to the mixture. Further, a solution including 60 parts by mass of magnesium chloride dissolved in 60 parts by mass of ion-exchanged water was added to the mixture at 30° C. over 10 minutes. After leaving the mixture for 3 minutes, the mixture was warmed to 80° C. over 60 minutes, After reaching 80° C., 43.25 parts by mass (solid equivalent) of the crystalline polyester resin particle dispersion B1 was added over 20 minutes. Thereafter, stirring was performed so that the particle growth rate was 0.01 μm/min, and the volume base median particle diameter of 6.0 μm measured by Coulter Multisizer 3 (manufactured Coulter Beckman).

Next, 43.25 parts by mass (solid equivalent) of the amorphous polyester resin particle dispersion C was added to the mixture over 30 minutes. Then, when the supernatant of the reaction solution became transparent, an aqueous solution in which 190 parts by mass of sodium chloride was dissolved in 760 parts by mass of ion-exchanged water was added to stop the growth of particle. The temperature of the mixture was raised to 80° C., and the mixture was stirred. In this condition, fusing of the particles was carried out until the average circularity of the toner particle became 0.970. Thereafter, the mixture was cooled to 30° C. or less.

Next, the temperature of the mixture was increased to 50° C. over 30 minutes while stirring. The mixture was subjected to 3 hours heat treatment. Then, mixture was cooled to 30° C. or less. After that, solid-liquid separation was performed and the dehydrated toner cake was again dispersed in ion-exchanged water. The operation of solid-liquid separation, that is, washing, was repeated three times. After washing, the toner base particle was obtained by drying at 40° C. for 24 hours. 0.6 parts by mass of hydrophobic silica particle (number average primary particle diameter: 12 nm, degree of hydrophobization: 68), 1.0 parts by mass of hydrophobic titanium oxide particle (number average primary particle diameter: 20 nm, degree of hydrophobization: 63), and 1.0 parts by mass of sol-gel silica (number average primary particle diameter: 110 nm) were added to the toner base particle, and mixed by Henschel mixer (manufactured by Nippon Coke and engineering Industry Co., Ltd.) at a rotating blade peripheral speed of 35 mm/sec for 20 minutes at 32° C. After the mixing, coarse particle were removed by using a sieve having an opening of 45 μm to obtain toner particle 11.

[Preparation of Toner Particle 13]

As shown in the following table 3, a toner particle 13 was produced in the same manner as in the toner particle 11, except that the crystalline polyester resin was not used.

TABLE 3

| Toner Particle | Amorphous resin particle | | Crystalline Polyester resin | | Shell (Amorphous Polyester Resin) | |
|---|---|---|---|---|---|---|
| | Type | Content (parts by mass) | Type | Content (parts by mass) | Type | Content (parts by mass) |
| 1 | Amorphous Resin Particle a1 (Amorphous DispresionA1) | 80 | B1 | 10 | Amorphous polyester resin c | 10 |
| 2 | Amorphous Resin particle a2 (Amorphous DispresionA2) | 80 | B1 | 10 | Amorphous polyester resin c | 10 |
| 3 | Amorphous Resin Particle a3 (Amorphous DispresionA3) | 80 | B1 | 10 | Amorphous polyester resin c | 10 |
| 4 | Amorphous Resin Particle a4 (Amorphous DispresionA4) | 80 | B1 | 10 | Amorphous polyester resin c | 10 |
| 5 | Amorphous Resin Particle a5 (Amorphous DispresionA5) | 80 | B1 | 10 | Amorphous polyester resin c | 10 |

TABLE 3-continued

| Toner Particle | Amorphous resin particle Type | Amorphous resin particle Content (parts by mass) | Crystalline Polyester resin Type | Crystalline Polyester resin Content (parts by mass) | Shell (Amorphous Polyester Resin) Type | Shell (Amorphous Polyester Resin) Content (parts by mass) |
|---|---|---|---|---|---|---|
| 6 | Amorphous Resin Particle a6 (Amorphous DispresionA6) | 80 | B1 | 10 | Amorphous polyester resin c | 10 |
| 7 | Amorphous Resin Particle a7 (Amorphous DispresionA7) | 80 | B1 | 10 | Amorphous polyester resin c | 10 |
| 8 | Amorphous Resin Particle a8 (Amorphous DispresionA8) | 80 | B1 | 10 | Amorphous polyester resin c | 10 |
| 9 | Amorphous Resin Particle a5 (Amorphous DispresionA5) | 80 | B2 | 10 | Amorphous polyester resin c | 10 |
| 10 | Amorphous Resin Particle a5 (Amorphous DispresionA5) | 80 | B3 | 10 | Amorphous polyester resin c | 10 |
| 11 | Amorphous Polyester C1 + Release Agent | 80 | B1 | 10 | Amorphous polyester resin c | 10 |
| 12 | Amorphous Resin Particle a1 (Amorphous DispresionA1) | 90 | — | — | Amorphous polyester resin c | 10 |
| 13 | Amorphous Polyester C1 + Release Agent | 90 | — | — | Amorphous polyester resin c | 10 |

7. Preparation of Electrostatic Latent Image Developing Toner

The respective toner particle and ferrite carrier having a volume base average particle diameter of 32 μm coated with acrylic resin were mixed so that the concentration of the toner particle was 6 mass %. Thus, the electrostatic latent image developing toner, which is a two component developer containing various toner particles, was produced.

8. Synthesis of Photocurable Varnishes

At the composition ratio (mass ratio) shown in the following table 4, photocurable compounds (monomers and/or polymers) and polymerization initiators were mixed to prepare photocurable varnishes (hereinafter, simply referred to as "varnish") N1-N4. The following table 4 also shows the physical properties of each varnish. The surface tension of the varnishes was measured by the plate method using KYOWA DY300 (manufactured by Kyowa Surface Chemical Co., Ltd.), and the viscosity measured with a vibrating viscometer 30 seconds after immersion of a vibrator to the varnish.

TABLE 4

| | | Varnish N1 | Varnish N2 | Varnish N3 | Varnish N4 |
|---|---|---|---|---|---|
| Photocurable Compound | 1,6-Hexanediol Diacrylate | 65 | 45 | 20 | — |
| | Trimethylolpropane Acrylate | | | 25 | 70 |
| | Phenoxy ethyl Acrylate | — | — | 30 | — |
| | Isobutyl Methacrylate/2-Ethylhexyl Acrylate Polymer (Melt Viscosity η: 4000 mPa·s) | 20 | — | — | — |
| | Styrene/2-Ethylhexyl Acrylate Polymer (Melt Viscosity η: 4000 mPa·s) | — | 40 | — | 15 |
| | Acrylic Polymer (Melt Viscosity η: 4000 mPa·s) | — | — | 10 | — |
| Polymerization Initiator | p-Methylbenzophenone | 10 | 10 | — | 10 |
| | Darocur 1173 (manufactured by BASF, Inc.) | 5 | 5 | — | 5 |
| | Irgacure TPO (manufactured by BASF, Inc.) | — | — | 10 | — |
| | Irgacure 184 (manufactured by BASF, Inc.) | — | — | 5 | — |
| | Surface Tension (mN/m) at 25° C. | 24.3 | 22.4 | 40 | 21.3 |
| | Viscosity at 25° C. (mPa·s) | 374 | 574 | 200 | 151 |

9. Forming of Image for Evaluation

A commercial multifunctional color printer Accurio Press C3080 (manufactured by Konica Minolta Co.) was used for evaluation of images. The coated paper 157 g/m² was selected as a paper type in the multifunctional color printer. In addition, the respective electrostatic latent image developing toners were respectively loaded on the multifunctional color printer. Then, a solid toner image having 8.0 g/m² toner adhering amount was formed on an A4 gloss coated paper (basis weight of 157 g per m²) under normal temperature and normal humidity (temperature of 20° C. and humidity of 50% RH), followed by fixing processing. The varnish was applied with a varnish coater (Digi UV, Coater manufactured by BN Technologies) on the solid toner image. The coating conditions were set at speed of 30 m/min and a coating thickness of approximately 5 μm. The combination of the electrostatic latent image developing toner and the varnish is shown in the following table.

10. Evaluation

A low-temperature fixing property and a fixing separating property of the electrostatic latent image developing toner produced by the above method were evaluated as follows. Further, the solid toner image prepared by the above method was evaluated for varnish wettability and varnish adhesion as follows.

[Low-Temperature Fixing Property]

A modified apparatus (a modified product capable of changing the surface temperature of the fixing upper belt and the fixing lower roller) of a commercially available full-color multifunctional color printer Accurio Press C3080 (manufactured by Konica Minolta Co., Ltd.) was used as an image forming device. The electrostatic latent image developing toner was sequentially loaded to the modified apparatus. Then, a test in which a solid image having a toner-adhering weight 11.3 g/m² was outputted on A4 (basis weight: 90 g per m²) plain paper at a fixing temperature of 100 to 200° C. was repeated. In this test, the fixing temperature was changed in increments of 5° C. Then, the lowest fixing temperature at which image contamination due to the fixing offset was not visually recognized was defined as the lowest fixing temperature. The practical lowest fixing temperature was less than 155° C.

[Fixing Separating Property] (Thin Paper Separability (the Amount of Leading End Margin that can be Separated))

A modified apparatus (a modified product capable of changing the surface temperature of the fixing upper belt and the fixing lower roller) of a commercially available full-color multifunctional color printer Accurio Press C3080 (manufactured by Konica Minolta Co., Ltd.) was used as an image forming device. The electrostatic latent image developing toner was sequentially loaded to the modified apparatus. Further, OK Top Coat+85 g/m² (manufactured by Oji Paper Co., Ltd.) was used as valuation papers. The temperature of the fixing upper belt (U.O. avoidance temperature+25° C.) was set to 25° C. higher than the temperature (U.O. avoidance temperature) at which under offset does not occur. The temperature of the fixing lower roller was set to 90° C. Then, a solid toner image (adhered amount 8.0 g/m²) was outputted, while changing the leading end margin amount. In this test, the leading edge margin amount immediately before the paper jam occurred was used as a measure of the thin paper separatability. The test was performed in a normal temperature and normal humidity environment (NN environment: 25° C., 50% RH). Also, the smaller the separable leading end margin, the better the separability. The practical minimum leading end margin was 6 mm or less, and it was judged to be acceptable.

[Varnish Wettability Evaluation]

The varnish layer on the solid toner image prepared by the above method was visually observed, and the wettability of the varnish was evaluated according to the following evaluation reference.

A: No pinhole with a diameter of 0.1 mm or more in 10 cm×10 cm B: No pinhole with a diameter exceeding 0.1 mm in 10 cm×10 cm, and no more than 2 pinholes with a diameter of 0.1 mm C: No pinhole with a diameter exceeding 0.1 mm in 10 cm× 10 cm, and 3 to 10 pinholes of 0.1 mm in diameter or less D: Existence of pinhole with a diameter exceeding 0.1 mm in 10 cm× 10 cm

[Adhesion Evaluation of Varnish]

A cellophane tape (CT-12) (manufactured by Nichiban Co., Ltd.) was stuck to a portion on which the varnish layer on the solid toner image prepared by the above method was applied. Then, the cellophane tape was peeled off, adhesion of the varnish was evaluated according to the following evaluation reference. A to C is within a practical range without problems.

A: No varnish peeling

B: Release of less than 10% of the adhesive area of the cellophane tape

C: Release of 10% or more and less than 30% of the adhesive area of the cellophane tape D: Release of 30% or more of the adhesive area of the cellophane tape

TABLE 5

| | Electrostatic Latent Image Developing Toner | Varnish | Low Temperature Fixing Property (° C.) | Fixing Separating Property (mm) | Varnish Wettability | Varnish Adhesion |
|---|---|---|---|---|---|---|
| EXAMPLE 1 | 1 | N1 | 130 | 4 | C | A |
| EXAMPLE 2 | 2 | N1 | 142 | 2 | A | C |
| EXAMPLE 3 | 3 | N1 | 136 | 3 | B | B |
| EXAMPLE 4 | 4 | N1 | 132 | 4 | B | A |
| EXAMPLE 5 | 5 | N1 | 140 | 2 | A | B |
| EXAMPLE 6 | 6 | N1 | 134 | 4 | A | A |
| EXAMPLE 7 | 7 | N1 | 134 | 2 | A | A |
| EXAMPLE 8 | 8 | N1 | 140 | 6 | A | A |
| EXAMPLE 9 | 9 | N1 | 134 | 2 | A | C |
| EXAMPLE 10 | 10 | N1 | 145 | 3 | B | B |
| EXAMPLE 11 | 11 | N1 | 133 | 1 | B | C |
| EXAMPLE 12 | 7 | N2 | 134 | 2 | A | A |
| EXAMPLE 13 | 7 | N3 | 134 | 2 | B | B |
| Comparative Example 1 | 12 | N1 | 160 | 0 | D | B |
| Comparative Example 2 | 13 | N1 | 156 | 1 | C | C |
| Comparative Example 3 | 1 | N4 | 130 | 4 | D | D |
| Comparative Example 4 | 12 | N4 | 160 | 0 | D | D |

[Results]

As shown in the above table, the toners 12 and 13 containing toner particle which contained no crystalline polyester resin had the poor low-temperature fixing property (Comparative Examples 1 2, and 4). In addition, in these toners, the varnish adhesion and the varnish wettability were lower than the corresponding examples. Further, in Comparative Examples 3 and 4, varnish N4 contained no diol di(meth)acrylate. Therefore, the varnish wettability and the varnish adhesion were very low.

In contrast, when the electrostatic latent image developing toners 1 to 11 including the toner particle which contains the crystalline polyester resin, and the varnishes N1 to N3 containing a diol di(meth)acrylate having a chain hydrocarbon structure were combined, each example had excellent varnish wettability and excellent varnish adhesion (Examples 1 to 13). In addition, the electrostatic latent image developing toners 1 to 11 including toner particle which contains the crystalline polyester resin had the excellent low-temperature fixing properties and the excellent fixing separating properties.

Although embodiments of the present invention have been described and illustrated in detail, the disclosed embodiments are made for purpose of illustration and example only and not limitation. The scope of the present invention should be interpreted by terms of the appended claims.

INDUSTRIAL APPLICABILITY

According to the image forming method of the present embodiment, it is possible to obtain the toner image with excellent low-temperature fixing property, excellent fixing separating property, and excellent abrasion resistance. With this method, the release agent is less likely to adhere to the member of the image forming device. Furthermore, adhesion between the varnish layer and the toner image is excellent. Therefore, it is expected that the present invention will contribute to further widespread use of the electrophotographic image forming method.

What is claimed is:

1. An image forming method comprising:
    forming a toner image on a recording medium using an electrostatic latent image developing toner containing a toner particle comprising a binder resin and a release agent; and
    forming a varnish layer on the toner image by applying and curing a photocurable varnish comprising a photocurable compound,
    wherein the binder resin comprised in the electrostatic latent image developing toner contains a crystalline polyester resin, and
    the photocurable compound comprised in the photocurable varnish comprises a diol di(meth)acrylate having a straight hydrocarbon chain.

2. The image forming method according to claim 1, wherein a main chain of the crystalline polyester resin has a straight hydrocarbon chain,
    wherein an absolute value of a difference between a number of carbon atoms of the straight hydrocarbon chain in the crystalline polyester resin and a number of carbon atoms of the straight hydrocarbon chain in the diol di(meth)acrylate is 8 or less.

3. The image forming method according to claim 1, wherein a number of carbon atoms of the straight hydrocarbon chain in the diol di(meth)acrylate is 4 to 12.

4. The image forming method according to claim 1, wherein the binder resin further comprises a vinyl-based resin,
    wherein an amount of the vinyl-based resin relative to 100 parts by mass of a total amount of the binder resin is 50 parts by mass or more.

5. The image forming method according to claim 1, wherein the binder resin further comprises an amorphous polyester resin.

6. The image forming method according to claim 1, wherein the crystalline polyester resin partially includes a structure derived from an amorphous resin.

7. The image forming method according to claim 1, wherein the release agent comprises an ester wax and a hydrocarbon wax.

8. The image forming method according to claim 7, wherein a content mass ratio of the ester wax and the hydrocarbon wax is 5/95 to 95/5.

9. The image forming method according to claim 1, wherein a surface tension of the photocurable varnish is 10 to 50 mN/m at 25° C., and
    wherein a viscosity at 25° C. of the photocurable varnish measured with a vibrating viscometer 30 seconds after immersion of a vibrator to the photocurable varnish is 10 to 800 mPa·s.

* * * * *